United States Patent [19]

Moore

[11] 4,096,758

[45] Jun. 27, 1978

[54] PRESSURE TO ELECTRIC TRANSDUCER

[75] Inventor: James O. Moore, Worcester Township, Montgomery County, Pa.

[73] Assignee: Moore Products Co., Spring House, Pa.

[21] Appl. No.: 799,957

[22] Filed: May 24, 1977

[51] Int. Cl.$^2$ .............................................. G01L 9/12
[52] U.S. Cl. ................................... 73/718; 324/61 R
[58] Field of Search ................. 73/398 C; 324/61 R; 361/283

[56] References Cited

U.S. PATENT DOCUMENTS

| 3,493,855 | 2/1970 | Norwich | 324/61 R |
| 3,626,287 | 12/1971 | DiNiro | 324/61 R |
| 3,858,097 | 12/1974 | Polye | 361/248 |

Primary Examiner—Charles A. Ruehl

Attorney, Agent, or Firm—Zachary T. Wobensmith, 2nd; Zachary T. Wobensmith, III

[57] ABSTRACT

A pressure to electric transducer is described employing an electrical capacitance formed by two parallel metal plates separated by a variable air gap, one of the plates being fixedly mounted and the other being movable to change the spacing in direct proportion to fluid pressure acting on an input element or capsule to which the movable plate is connected. The capacitance forms one leg of a negative feed back divider network, for controlling an operational amplifier so that its gain is directly proportional to the spacing of the plates. The amplifier is driven by a constant alternating current source so that its output is directly proportional to the applied pressure. The voltage output can be rectified and transformed in a conventional manner for transmission of a signal.

10 Claims, 2 Drawing Figures

PRESSURE TO ELECTRIC TRANSDUCER

BACKGROUND OF THE INVENTION

1. Field of the Invention

This invention relates to transducers and more particularly to a transducer for converting an applied fluid pressure signal to a voltage output.

2. Brief Discussion of the Prior Art

It has heretofore been proposed to employ capacitive type transducers but these have had various shortcomings including deviation from a linear relationship between the electrical output and the spacing of the capacitor plates, non-linearities of the fluid pressure applying element, difficulties attendant upon humidity and condensation and lack of adequate shielding.

SUMMARY OF THE INVENTION

In accordance with the invention a pressure to electric transducer is provided employing an electrical capacitance formed by two parallel metal plates, separated by a variable air gap, one of the plates being fixedly mounted and the other being movable to change the spacing in direct proportion to fluid pressure acting on an input element or capsule to which the movable plate is connected. The capacitance forms one leg of a negative feed back divider network for controlling an operational amplifier so that its gain is directly proportional to the spacing of the plates. The amplifier is driven by an adjustable alternating current source so that its output is directly proportional to the applied pressure. The voltage output can be rectified and transformed in any conventional manner for transmission of a signal for use in computers, data loggers, controllers and other electronic accumulation and/or readout systems.

It is the principal object of the invention to provide a pressure to electric transducer in which a pressure activated element moves one plate of a capacitor relative to the other with a linear relation between the plate position and electric output.

It is a further object of the invention to provide a pressure to electric transducer in which linear operation is achieved by the use of an adjustable frequency oscillator.

It is a further object of the invention to provide a pressure to electric transducer in which linear operation is achieved by the use of a capacitance as one leg of a negative feed back divider network for controlling an operational amplifier.

It is a further object of the invention to provide a pressure to electric transducer with shielding means to minimize the effects of moisture and condensation at the capacitance plates and without the necessity for hermetic sealing.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 1:
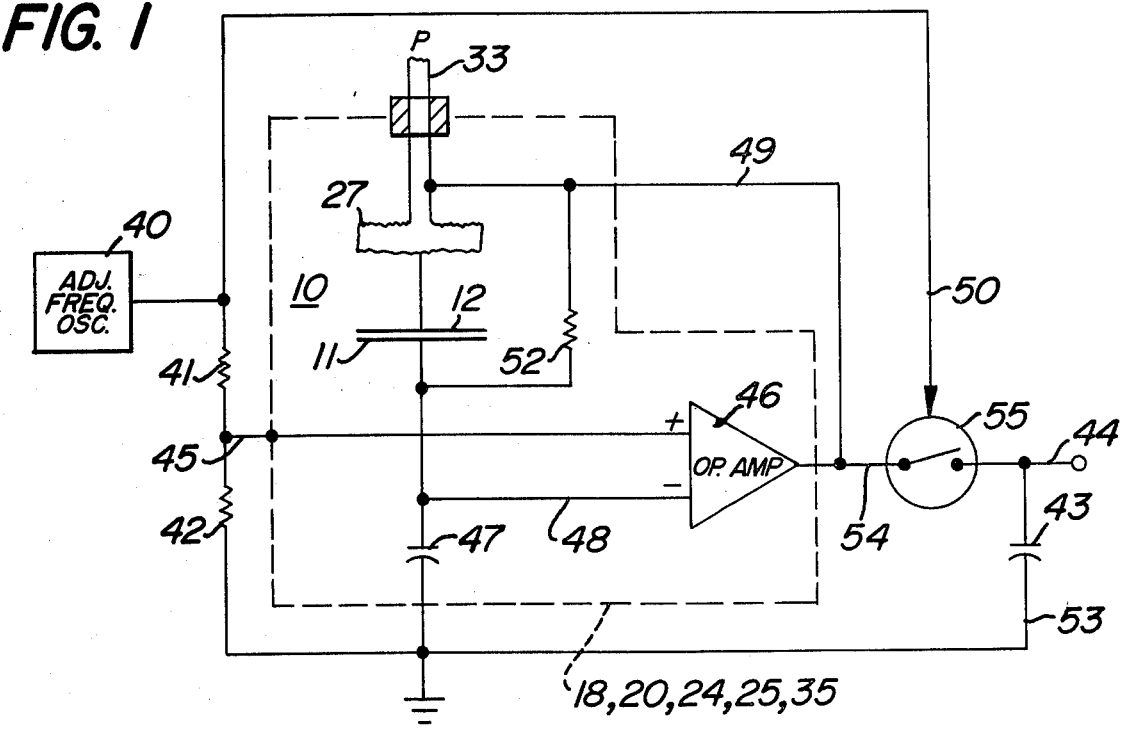
FIG. 1 is a diagrammatic view of a preferred embodiment of the invention.
Figure 2:
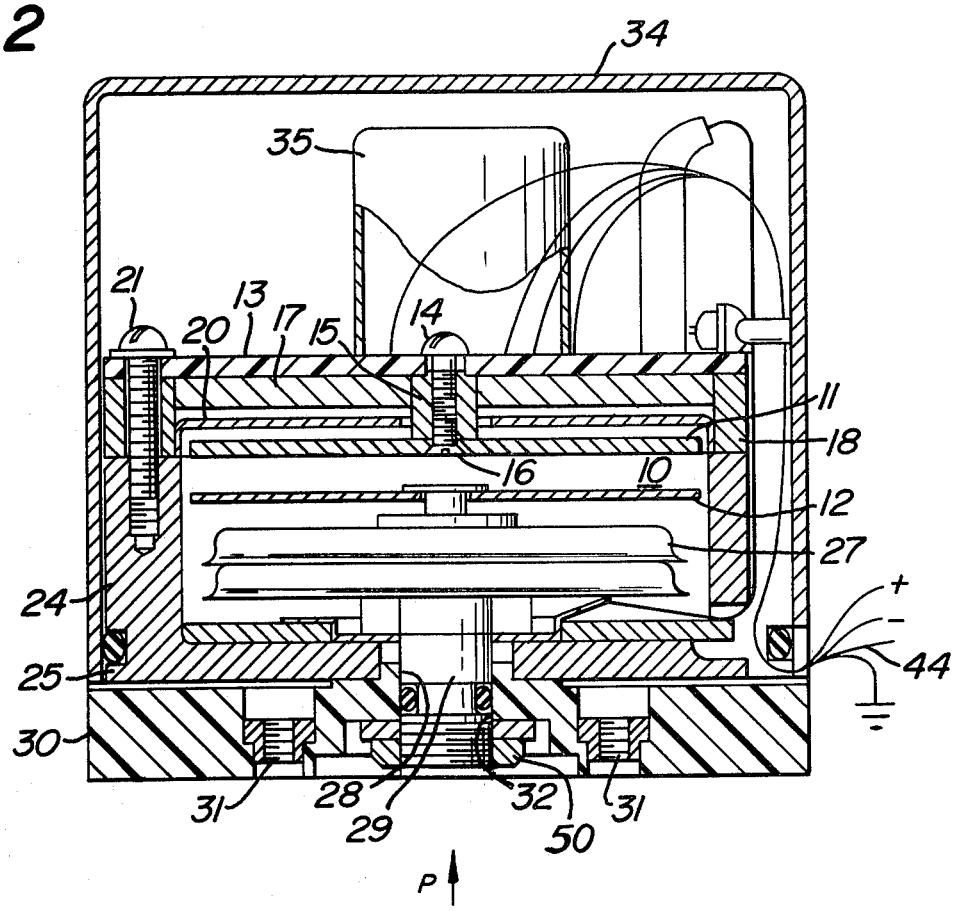
FIG. 2 is a vertical central sectional view of a preferred form of capsule assembly employed in connection with the invention.

It should, of course, be understood that the description and drawings herein are illustrative merely and that various modifications and changes can be made in the structure disclosed without departing from the spirit of the invention.

DESCRIPTION OF THE PREFERRED EMBODIMENT

Referring now more particularly to the drawings, the transducer in accordance with the invention preferably includes a capacitance 10, comprising two circular metal plates 11 and 12. The plate 11 is fixedly mounted on a printed circuit board 13. The plate 11 is secured to the board 13 by a screw 14 which engages with an internally threaded metal collar 15 to which the capacitor plate 11 is secured by a metallic fastener 16. The lower face of the board 13 has a layer 17 of potting compound applied thereon. The thickness of the layer 17 is sufficient so that the capacitive effect of any moisture film forming thereon will be insignificant.

A metallic mounting ring 18 is provided and has pressed thereinto a metallic protective or shielding sheet 20, the ring 18 serving as a support for the board 13.

Retaining screws 21 extend through the board 13, the ring 18 and into engagement in the upwardly extending rim 24 of a metallic cup 25.

Within the interior space in the cup 25 the movable capacitor plate 12 is provided, secured to a resilient expansible pressure input element, such as a capsule 27.

The cup 25 has an opening 28 through which the threaded hollow stem 29 of the capsule 27 extends.

An insulating mounting block 30 is provided outside the cup 25, is secured in place with respect to the cup 25 by a nut 50 threaded on the stem. An adapter (not shown) is secured in pressure tight relation to the block 30 by screws (not shown) engaged in nuts 31 for connection to a pressure source and has an opening 32 at which a fluid pressure input connection 33 communicating with the interior of the capsule 27 is provided. A cover 34 in engagement with the cup 25 is provided for protection against the entry of dust.

A metal can 35 is provided mounted on the board 13 and is connected to the mounting ring 18 by circuit elements printed on the board 13.

The ring 18, the sheet 20, the cup 25 with its rim 24 and the metal can 35 comprise a metallic shield which completely encloses the capsule 27, the plates 11 and 12, an operational amplifier 46, and a resistor 52 effectively isolating these elements from stray capacitance effects of surrounding components and surfaces.

Referring now to FIG. 1 an adjustable frequency oscillator 40 is provided serving as an input source and which may be carried on the upper face of the board 13.

The output of oscillator 40 is reduced by a voltage divider which includes resistor 41 in series with a resistor 42 with a connection 45 to the positive input terminal of the operational amplifier 46 which is preferably mounted on the plate 13 within the can 35.

The output of the operational amplifier 46 is fed back through a conductor 49 to a voltage divider network comprising capacitor 10 in series with capacitor 47. The divided voltage is connected through conductor 48 to the negative input terminal of the amplifier 46. A resistor 52 is connected in parallel with capacitor 10 and makes the feedback network frequency responsive so that its characteristics can be changed by altering the input frequency. The metallic shield comprising the ring 18, sheet 20 and cup 25 with its rim 24 and can 35 are connected to the same potential as that supplied to the plus input of the amplifier 46.

The feedback network formed by the capacitance 10, the capacitance 47 and the resistor 52 determines the gain of the operational amplifier 46.

The negative input terminal of the amplifier 46 is connected by a conductor 48 between capacitance 47 and the connection to the resistor 52.

If the input frequency of the oscillator 40 is high enough, the reactance of capacitor 10 will be much lower than the resistance of resistor 52. Then the gain of the operational amplifier 46 may be expressed as follows:

$$\text{Gain} = 1 + C_{47}/C_{10} \quad (1)$$

where $C_{47}$ is the capacitance of capacitor 47 and $C_{10}$ is the capacitance of the capacitor 10.

$C_{10}$ is related to the spacing between the plates 11 and 12 as follows:

$$C_{10} = K/\text{spacing} \quad (2)$$

where $K$ is a constant determined by the dimensions of the plates 11 and 12 and other circuit constants. From these equations it will be seen that $$\text{Gain} = 1 + (C_{47}/K) \, (\text{spacing}) \quad (3)$$

This shows a linear relationship between the spacing of the plates 11 and 12 and the gain of the amplifier 46.

Since the position of the plate 12 is also linearly related to the pressure applied to the capsule 27, it follows that the output voltage of the amplifier 46 will also bear a linear relation to the applied pressure.

The output of the amplifier 46 is preferably rectified by a synchronous rectifier 55 controlled by the output of the oscillator 40 through connection 50 and the output of the synchronous rectifier 55 can be filtered by capacitor 43. The filtered output is available at the output signal line 44 for further utilization.

The ideal relationships expressed in the equations above are not generally realized exactly in practice and, therefor, it is advisable to make provision to alter slightly the relationships. This is accomplished by the action of resistor 52 connected in parallel with the variable capacitor 10. The effect of resistor 52 is to decrease the gain of amplifier 46. Its relative effect is greater when the spacing between plates 11 and 12 is greater. Its relative effect is also greater if the input frequency supplied by oscillator 40 is decreased. Thus, at lower frequencies the gain of the amplifier 46 will be less than that indicated by equation (3) above when the plate spacing is greater. This will result in a droop or curvature in the relation between gain and spacing causing it to depart slightly from the linear characteristic. The direction of the droop is such that it will compensate or cancel out the nonlinearity most commonly encountered in pressure capsules. Since the amount of this droop is also frequency dependent it is convenient to adjust the frequency of the driving oscillator 40 to obtain the desired amount of compensation.

I claim:

1. A pressure-to-electric transducer comprising
 a housing,
 a fluid pressure responsive member in said housing,
 a capacitor in said housing having a fixed plate and a movable plate connected to said fluid pressure responsive member for movement thereby,
 an operational amplifier for delivery of an output signal,
 said amplifier having a negative input terminal, a positive input terminal and an output terminal,
 means for determining the output of said amplifier in response to a fluid pressure applied at said fluid pressure responsive member,
 said means comprising an oscillator as an input source connected to said positive input terminal, and
 a feedback network including said capacitor and a resistor connected between said output terminal and said negative input terminal of said amplifier for controlling the gain of said amplifier.

2. A transducer as defined in claim 1 in which a metallic shield is provided within which said plates are disposed.

3. A transducer as defined in claim 2 in which said fluid pressure responsive member is disposed within said metallic shield.

4. A transducer as defined in claim 3 in which said fluid pressure responsive member has a fluid connection, and
 said shield is electrically isolated from the fluid connection of said pressure responsive member.

5. A transducer as defined in claim 2 in which said amplifier is disposed within said metallic shield.

6. A transducer as defined in claim 2 in which said shield has the same potential applied thereto as is applied at one of the input connections of the amplifier.

7. A transducer as defined in claim 1 in which said resistor is connected in parallel with said capacitor.

8. A transducer as defined in claim 1 in which said oscillator is adjustable for controlling the linearity between the pressure input to said fluid pressure responsive member and the output signal of the amplifier.

9. A pressure-to-electric transducer comprising
 a housing,
 a fluid pressure responsive member in said housing,
 a capacitor in said housing having a fixed plate and a movable plate connected to said fluid pressure responsive member for movement therewith,
 an operational amplifier for delivery of an output signal,
 means for determining the output of said amplifier in response to a fluid pressure applied at said fluid pressure responsive member,
 said means comprising a variable frequency oscillator as an input source,
 a negative feedback network including said capacitor for controlling the gain of said amplifier,
 a metallic shield within which said plates are disposed,
 said metallic shield comprising a cylinder closed at one end and having an inserted metallic dished sheet at the other end, and
 a printed circuit board closing said other end.

10. A transducer as defined in claim 9 in which said board has interiorly thereof a layer of potting compound of sufficient thickness to prevent capacitance effects of moisture on the exposed surface thereof.

* * * * *